(12) United States Patent
Lee et al.

(10) Patent No.: US 9,954,858 B2
(45) Date of Patent: Apr. 24, 2018

(54) FINGERPRINT RECOGNITION-BASED CONTROL METHOD AND DEVICE

(71) Applicant: Samsung Electronics Co., Ltd., Suwon-si, Gyeonggi-do (KR)

(72) Inventors: Hyunjeong Lee, Hwaseong-si (KR); Chang Kyu Choi, Seongnam-si (KR); Sungjoo Suh, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/064,070

(22) Filed: Mar. 8, 2016

(65) Prior Publication Data

US 2016/0307025 A1 Oct. 20, 2016

(30) Foreign Application Priority Data

Apr. 16, 2015 (KR) .......................... 10-2015-0053817

(51) Int. Cl.
*G06K 9/00* (2006.01)
*H04L 29/06* (2006.01)

(52) U.S. Cl.
CPC ...... *H04L 63/0861* (2013.01); *G06K 9/00006* (2013.01); *G06K 9/00013* (2013.01)

(58) Field of Classification Search
None
See application file for complete search history.

(56) References Cited

U.S. PATENT DOCUMENTS

| 6,392,636 | B1 * | 5/2002 | Ferrari | G06F 3/03547 |
| | | | | 345/157 |
| 7,274,808 | B2 * | 9/2007 | Baharav | G06F 3/0421 |
| | | | | 382/124 |
| 8,023,700 | B2 | 9/2011 | Riionheimo | |
| 8,813,251 | B2 * | 8/2014 | Kim | H04L 63/105 |
| | | | | 382/124 |
| 9,043,940 | B2 * | 5/2015 | Kim | H04L 63/105 |
| | | | | 382/124 |
| 9,465,930 | B2 * | 10/2016 | Alten | G06F 21/32 |
| 2004/0123113 | A1 * | 6/2004 | Mathiassen | B60R 25/252 |
| | | | | 713/185 |

(Continued)

FOREIGN PATENT DOCUMENTS

| KR | 100693592 B1 | 3/2007 |
| KR | 100752844 B1 | 8/2007 |

(Continued)

*Primary Examiner* — Feng Niu
(74) *Attorney, Agent, or Firm* — Harness, Dickey & Pierce, P.L.C.

(57) ABSTRACT

A fingerprint recognition-based control method may include acquiring sensor data with a fingerprint sensor. The sensor data may be acquired by the fingerprint sensor in response to a contact between a physical object and a sensing area of the fingerprint sensor. The method may further include receiving an input through a first input receiver from among one or more input receivers. The first input receiver may be located in a vicinity of the fingerprint sensor. The method may further include verifying the sensor data to be an input fingerprint; and sensing a motion of the physical object based on the acquired sensor data and the received input, in response to a positive result of the verifying.

20 Claims, 13 Drawing Sheets

(56) References Cited

U.S. PATENT DOCUMENTS

| | | | |
|---|---|---|---|
| 2008/0036739 A1* | 2/2008 | Juh | G06F 3/03547 345/161 |
| 2008/0063245 A1* | 3/2008 | Benkley | G06F 3/041 382/124 |
| 2011/0300829 A1 | 12/2011 | Nurmi et al. | |
| 2012/0075229 A1 | 3/2012 | Summers | |
| 2012/0092293 A1 | 4/2012 | Ganapathi et al. | |
| 2015/0135108 A1* | 5/2015 | Pope | G06K 9/00006 715/767 |
| 2016/0063230 A1* | 3/2016 | Alten | G06F 21/32 726/28 |
| 2016/0378966 A1* | 12/2016 | Alten | G06F 21/32 726/19 |

FOREIGN PATENT DOCUMENTS

| | | |
|---|---|---|
| KR | 20100104648 A | 9/2010 |
| KR | 101136153 B1 | 4/2012 |
| KR | 101160452 B1 | 6/2012 |
| KR | 101391740 B1 | 5/2014 |
| KR | 20140092134 A | 7/2014 |

* cited by examiner

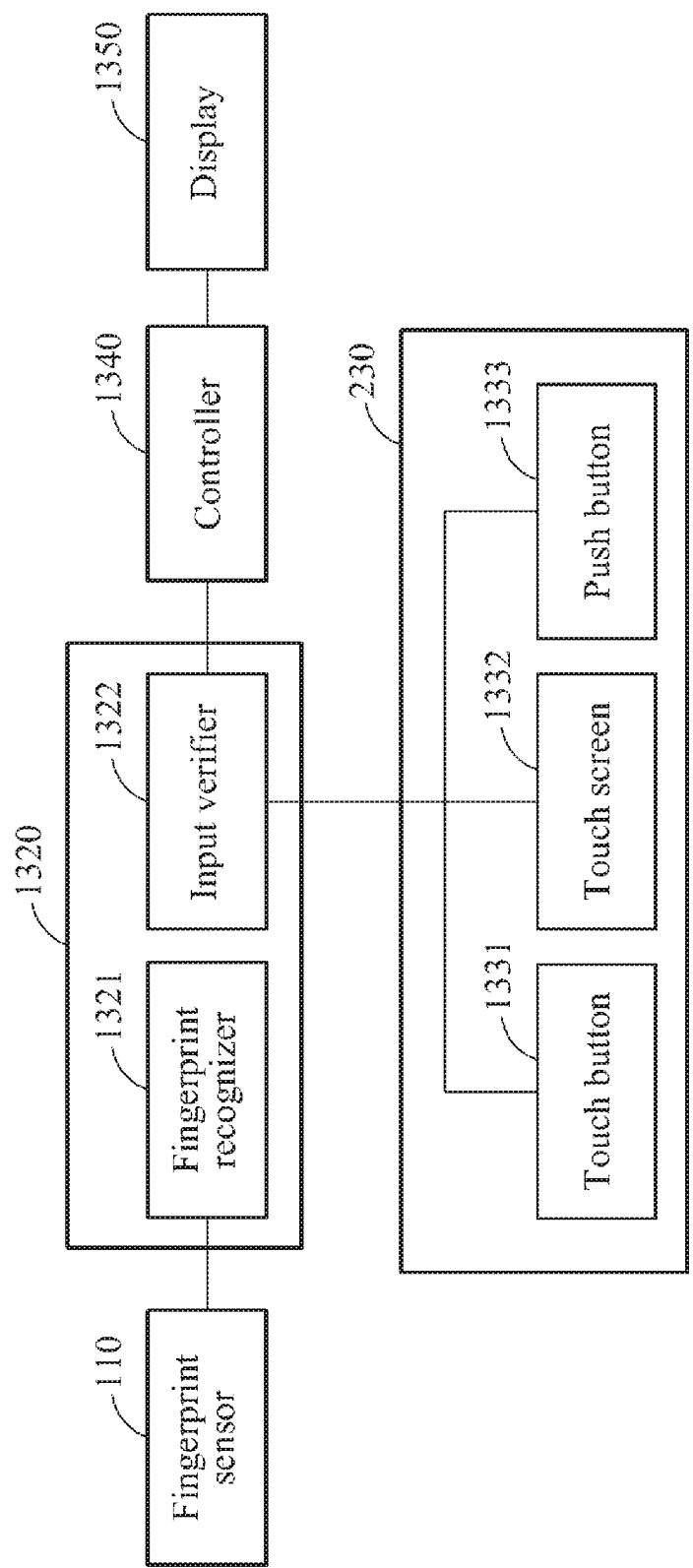

FINGERPRINT RECOGNITION-BASED CONTROL METHOD AND DEVICE

CROSS-REFERENCE TO RELATED APPLICATION

This application claims under 35 U.S.C. § 119 to Korean Patent Application No. 10-2015-0053817, filed on Apr. 16, 2015, in the Korean Intellectual Property Office, the entire contents of which are incorporated herein by reference in its entirety.

BACKGROUND

1. Field

At least one example embodiment relates to a method of controlling a device through a fingerprint recognition.

2. Description of the Related Art

With an increasing use of personal mobile terminals such as a laptop computer, a smartphone, and the like, an importance of data security is increasing. Thus, continual efforts have been made to reinforce security by applying various biometrics technologies to the mobile terminals. Among the biometrics technologies, fingerprint recognition is being widely used due to effects of ensuring a high security at a low cost and utilizing a fingerprint sensor provided in a compact size.

Also, various efforts have been made to easily control portions of a mobile terminal while using various functions provided with smartphone developments. Accordingly, there is a desire for a control method using a fingerprint sensor included in a mobile terminal.

SUMMARY

At least some example embodiments relate to a fingerprint recognition-based control method.

According to at least some example embodiments, a fingerprint recognition-based control method may include acquiring, by a fingerprint sensor, sensor data in response to a contact between a physical object and a sensing area of the fingerprint sensor; receiving an input through a first input receiver from among one or more input receivers, the first input receiver being located in a vicinity of the fingerprint sensor; verifying the sensor data to be an input fingerprint; and sensing a motion of the physical object based on the acquired sensor data and the received input, in response to a positive result of the verifying.

The method may further include identifying a command based on the motion and performing an operation assigned to the identified command.

The first input receiver may be an input receiver in which the fingerprint sensor is embedded.

The sensing may include sensing the motion based on a location relationship between the fingerprint sensor and the first input receiver in addition to the acquired sensor data and the received input.

The sensing may include determining the motion to be a first direction slide in response to an input received using an input receiver, from among the one or more input receivers, that is located in a first direction relative to the fingerprint sensor.

The sensing may include determining the motion to be a first direction slide in response to the sensor data acquired by the fingerprint sensor being located in a first direction relative to an input receiver, from among the one or more input receivers, that receives input.

The one or more input receivers may include two or more input receivers and the sensing may include sensing the motion in response to, the sensor data, and first and second inputs received using at least two different input receivers from among the two or more input receivers, respectively.

The method may further include activating a device in response to the positive result of the verifying.

The method may further include determining whether the input fingerprint matches a registered fingerprint in response to the positive result of the verifying; and releasing a lock state of a device if the input fingerprint is determined to match the registered fingerprint.

The method may further include sensing a movement of a contact being made with the sensing area of the fingerprint sensor based on the sensor data.

The method may further include sensing the motion based on at least one of a time at which the physical object makes the contact with the sensing area of the fingerprint sensor, a change in a location at which the contact is made, a number of times that the contact is made, or an intensity of a pressure by the contact.

The method My further include authorizing a protected operation to be performed in response to the positive result of the verifying; and performing the protected operation based on the authorizing when an operation assigned to a command identified based on the motion is the protected operation.

The method may further include determining whether the input fingerprint matches a registered fingerprint in response to the positive result of the verifying; performing an operation assigned to a command identified based on the motion in response to the input fingerprint being determined to match the registered fingerprint; and performing the operation assigned to the command identified based on the motion by restricting at least a portion of the operation in response to the input fingerprint being determined not to match the registered fingerprint.

According to at least some example embodiments, a fingerprint recognition-based control method may include receiving, time-sequentially, a plurality of inputs from an individual in time series; verifying whether sensor data acquired in response to at least one input for a fingerprint sensor among the plurality of inputs is a fingerprint; identifying an input sequence from the plurality of inputs in response to the sensor data being verified to be the fingerprint; and performing an operation assigned to the identified input sequence.

The receiving may include receiving a plurality of items of sensor data from the fingerprint sensor in time series.

The receiving may include receiving at least one item of sensor data from the fingerprint sensor and at least one input from at least one input receiver located in a vicinity of the fingerprint sensor or includes the fingerprint sensor in time series, and the identifying may include determining whether the at least one item of sensor data acquired by the fingerprint sensor matches a registered fingerprint, and determining whether the at least one input received from the at least one input receiver is a first input.

The identifying may include determining whether at least one ordinal input among the time-sequentially received inputs is a first input.

The identifying may further include identifying the input sequence and ignoring an input other than the at least one ordinal input when the at least one ordinal input is the first input.

The receiving may include acquiring a plurality of items of sensor data from the fingerprint sensor in time series, and the identifying may include determining whether a first ordinal input among the time-sequentially received inputs is a registered fingerprint, and determining whether a second ordinal input among the time-sequentially received inputs is a non-registered fingerprint.

The identifying may include determining whether each of the plurality of inputs is input as a first motion.

According to at least some example embodiments, a biometrics-based control method includes acquiring biometric data of a user in response to a contact between a physical object and a sensing area of a sensor; receiving an input through a first input receiver from among one or more input receivers, the first input receiver being located in a vicinity of the sensor; and sensing a motion of the physical object based on the acquired biometric data and the received input in response to the biometric data being verified to be a first type of biometric data.

The biometric data may include at least one of fingerprint information, blood vessel information, and iris information.

A non-transitory computer-readable medium comprising program code that, when executed by a processor, causes the processor to perform the fingerprint recognition-based control method.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 13 illustrates yet another example of a fingerprint recognition-based control device according to at least one example embodiment.

DETAILED DESCRIPTION

Figure 1:
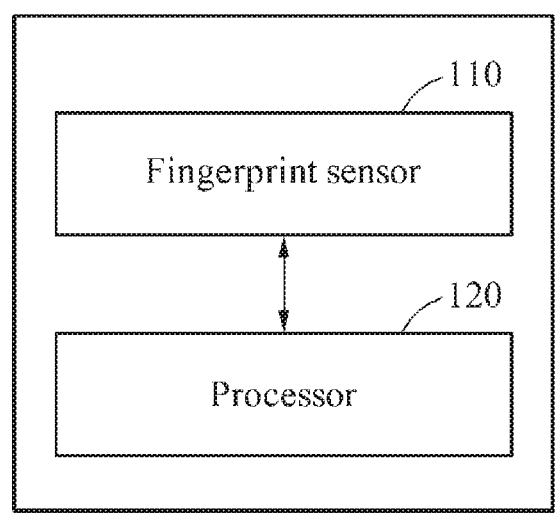
FIG. 1 illustrates an example of a fingerprint recognition-based control device according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Figure 2:
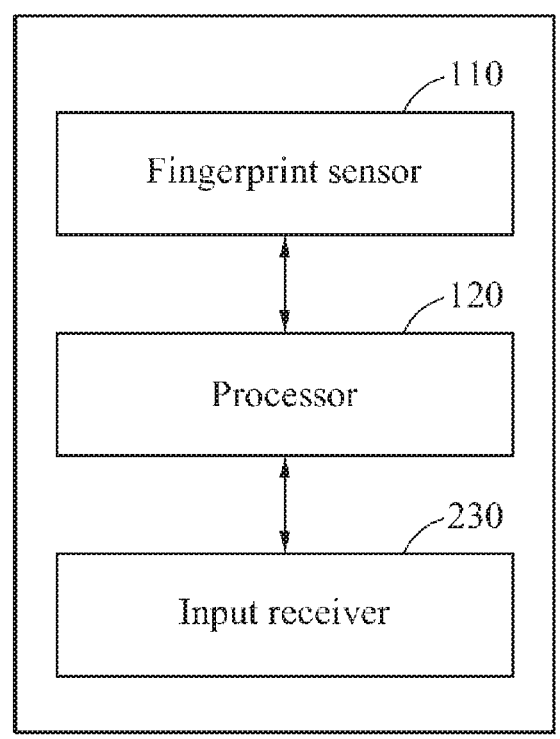
FIG. 2 illustrates another example of a fingerprint recognition-based control device according to at least one example embodiment.

FIGS. 1 and 2 illustrate a fingerprint recognition-based control device 100 according to at least one example embodiment.

Referring to FIG. 1, the fingerprint recognition-based control device 100 may include a fingerprint sensor 110 and a processor 120. The fingerprint recognition-based control device 100 may include, for example, a mobile phone, a smart phone, a laptop computer, a digital broadcasting terminal device, a digital camera, a portable game terminal, a personal digital assistants (PDA), a portable multimedia player (PMP), a navigation, and a tablet personal computer (PC). However, a type of the fingerprint recognition-based control device 100 is not limited to the above-referenced examples. Alternatively, the fingerprint recognition-based control device 100 of FIG. 1 may be, for example, any electronic fingerprint recognition-based control device including the fingerprint sensor 110 and using a security function. Also, the electronic fingerprint recognition-based control device may include, for example, data communication equipment, multimedia equipment, and application equipment thereof.

The fingerprint sensor 110 may acquire sensor data in response to a contact between a physical object and a sensing area of the fingerprint sensor 110. According to at least one example embodiment, when the physical object having a dielectric constant that matches a reference dielectric constant or, alternatively, is within a desired range of values is detected in the sensing area of the fingerprint sensor 110, the fingerprint sensor 110 may perform sensing of the physical object. In this example, when the physical object has a dielectric constant of a human, the fingerprint sensor 110 may continuously sense the physical object irrespective of whether the physical object is a fingerprint. Conversely, when the physical object has a dielectric constant differing from the dielectric constant of the human, the fingerprint sensor 110 may not sense the physical object.

A fingerprint may include a ridge and a valley between ridges. The fingerprint sensor 110 may sense shapes of the ridge and the valley. The sensor data acquired through the sensing may be provided in a form of a signal. The sensor data may be formed to be an image through an image processing.

The fingerprint sensor 110 may sense the physical object based on a swipe type sensing method and a touch type sensing method. In the swipe type sensing method, the sensing may be performed by the fingerprint sensor 110 when a surface of a finger having the fingerprint is positioned in the sensing area the fingerprint sensor 110 and is swiped the finger in a particular or, alternatively, predetermined direction. In the touch type sensing method, the sensing may be performed by the surface of the finger making contact with the fingerprint sensor 110 during a predetermined period of time or, alternatively, at least an amount of time necessary for the fingerprint sensor 110 to complete a sensing operation. Hereinafter, the following descriptions will be provided based on an example of the fingerprint sensor 110 using the touch type sensing method. However, the present disclosure is not limited thereto. As an alternative, depending on an example, the fingerprint sensor 110 using the swipe type sensing method may also be used.

According to at least one example embodiment, the fingerprint recognition-based control device 100 may determine whether a fingerprint input of the fingerprint sensor 110 is a pseudo input such that the fingerprint sensor 110 quickly enters a low power mode. Also, the fingerprint recognition-based control device 100 may control the fingerprint sensor 110 to sense the fingerprint input when a user has an intention of inputting the fingerprint. Through this, the fingerprint recognition-based control device 100 may effectively reduce power consumption for an unintended fingerprint input.

The fingerprint sensor 110 may transmit the acquired sensor data to the processor 120 to perform the image processing and a fingerprint authentication. The image processing may be performed by forming the sensor data to be an image. The fingerprint authentication may be performed by determining whether the sensed fingerprint matches a registered fingerprint. According to at least one example embodiment, a feature point extracted from the image may be used to determine whether the sensed fingerprint matches the registered fingerprint. The feature point may be, for example, a junction of the ridges and an end point of the ridge. According to at least one other example embodiment, the fingerprint recognition-based control device 100 may compare the image of the sensed fingerprint to the image of the registered fingerprint to determine whether the sensed fingerprint matches a registered fingerprint. Also, the fingerprint recognition-based control device 100 may determine whether the sensed fingerprint matches a registered fingerprint based on various fingerprint authentication methods as well as the foregoing.

Although the aforementioned descriptions are provided based on an example of recognizing the user by using a portion of the fingerprint of the user, the present disclosure may also be extended to an example of recognizing the user by using a portion of biometric data of the user. According to at least one example embodiment, a sensor to acquire the biometric data may be used in lieu of the fingerprint sensor 110.

According to at least one example embodiment, the sensor may include a sensor to recognize a blood vessel pattern of the user. The sensor may extract the blood vessel pattern from a dorsum skin of the user. The user may increase or, alternatively, maximize a brightness contrast of a blood vessel to a skin using an infrared lighting and a filter, thereby acquiring an image including the blood vessel pattern. The processor 120 may compare the blood vessel pattern to a registered blood vessel pattern. As used herein, the term registered may refer to, for example, registered elements that are pre-registered and registered elements that are not pre-registered. For ease of explanation, the present disclosure refers primarily to examples where elements are pre-registered. However, example embodiments are not limited to these examples.

According to at least one other example embodiment, the sensor may include a sensor to acquire an iris pattern of the user. The sensor may scan or capture the iris pattern between a pupil and a sclera, for example, a white area of an eye. Through this, the sensor may acquire a partial image corresponding to a portion of the iris pattern. Thus, the processor 120 may compare the iris pattern to a pre-registered iris pattern.

The processor 120 may verify whether the sensor data is the fingerprint. For example, the processor 120 may determine whether the received sensor data is data having a shape of the fingerprint. The fingerprint may have a shape in which the ridge and the valley are formed repetitively. Thus, the processor 120 may determine that the received sensor data is not the data having the shape of the fingerprint when the received sensor data does not include the ridge and the valley, or when a space between the ridges or a width between the ridge and the valley of the sensor data is greater than a predetermined value (e.g., a threshold value that may be stored in the device 100). However, the present disclosure is not limited thereto. Alternatively, the processor 120 may use various methods of determining whether the sensor data is the data in the shape of the fingerprint based on, for example, the form of the signal and the number of feature points.

Also, the processor 120 may sense a motion of the physical object based on the sensor data acquired by the fingerprint sensor 110 in response to the sensor data being verified to be the fingerprint. The processor 120 may identify a command based on the motion, and perform an operation assigned to the identified command. The sensing of the motion and the operation performed based on the motion will be explained in detail with reference to the following descriptions.

In the present disclosure, the fingerprint sensor 110 may acquire the sensor data by sensing the physical object, and the processor 120 may perform the image processing and the fingerprint authentication on the sensor data.

Referring to FIG. 2, the fingerprint recognition-based control device 100 may further include an input receiver 230.

The input receiver 230 may be a device (e.g., an electronic or electromechanical device) for receiving an input from an individual. Examples of the input receiver include, but are not limited to, a push input sensor (e.g. a button), a touch input sensor, a switch, and a dial. The input receiver 230 may receive various types of inputs including, for example, a touch input, a push input, a toggle input, and a dial input.

According to at least one example embodiment, the touch input may indicate an input generated by a motion of the physical object making contact with the input receiver 230. The push input may indicate an input generated by a motion of applying a pressure to the input receiver 230. In this example, the input receiver 230 may receive an input corresponding to a pressure vertically applied by the physical object. However, a direction of the pressure is not limited thereto. Depending on an example, the input receiver 230 may also receive an input corresponding to a pressure applied in one direction, for example, up, down, left, or right directions, as a horizontal direction. The toggle input may indicate an input generated by a motion of switching a state to, for example, an on/off state, in the input receiver 230. The dial input may indicate an input generated by a motion of rotating a physically-manipulatable device in a clockwise direction or in a counter-clockwise direction. A type of the input received by the fingerprint recognition-based control device 100 is not limited to the foregoing.

According to at least one example embodiment, at least one input receiver, for example, the input receiver 230 may be located in a vicinity of the fingerprint sensor 110. The input receiver 230 may be located in the vicinity of the fingerprint sensor 110 on the same side of the fingerprint recognition-based control device 100. Alternatively, the input receiver 230 may be located on a side adjacent to a side on which the fingerprint sensor 110 is located in the fingerprint recognition-based control device 100 so as to be in a vicinity of the fingerprint sensor 110.

Also, the fingerprint sensor 110 may be embedded on an input side of the input receiver 230 located on the same side on which the fingerprint sensor 110 is located.

Figure 3:
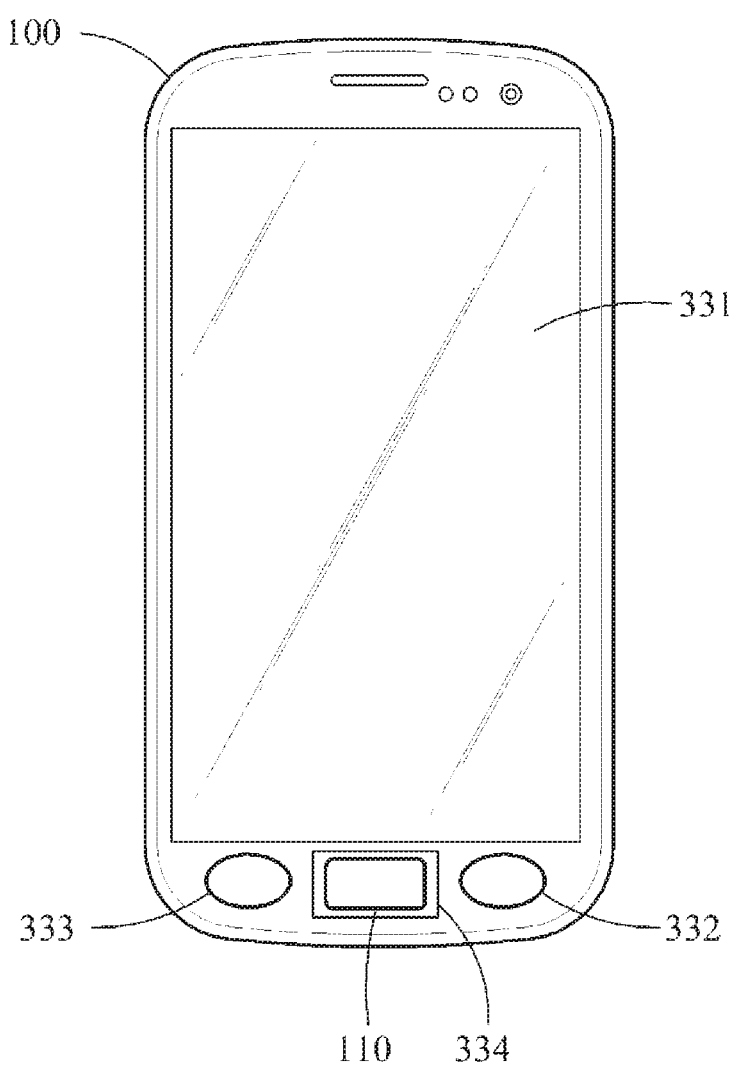
FIG. 3 illustrates still another example of a fingerprint recognition-based control device according to at least one example embodiment.

According to at least one example embodiment, as illustrated in FIG. 3, when the fingerprint sensor 110 is located on a front side of the fingerprint recognition-based control device 100, the input receiver 230 may also be located on the front side of the fingerprint recognition-based control device 100, the fingerprint sensor 110 may be embedded in one of the one or more input receivers, for example, the input receiver 230, and a remaining input receiver aside from the input receiver 230 may be located on the front side of the fingerprint recognition-based control device 100 to be adjacent to the fingerprint sensor 110. The vicinity of the fingerprint sensor 110 may be defined as, for example, an area of the fingerprint recognition-based control device 100 that would allow a sensor located on the area to detect, through contact with the object, a motion of the object moving away from the fingerprint sensor 110 or a central portion of the fingerprint sensor 100. For example, the vicinity of the fingerprint sensor 110 may be an area of the fingerprint recognition-based control device 100 adjacent to the fingerprint sensor 110 on a side of the fingerprint recognition-based control device 100 adjacent to a side on which the fingerprint sensor 110 is located. As another example, the vicinity of the fingerprint sensor 110 may be an area of the fingerprint recognition-based control device 100 adjacent to the fingerprint sensor 110 on the same side of the fingerprint recognition-based control device 100 as a side on which the fingerprint sensor 110 is located. For example, as is shown in FIG. 3 (which will be discussed in greater detail below) each of a first input receiver 331, a second input receiver 332, a third input receiver 333, and a fourth input receiver 334 in the vicinity of the fingerprint sensor 110.

According to at least one example embodiment, the fingerprint recognition-based control device 100 may control the operation based on an input received from the fingerprint sensor 110 and the input receiver 230 located in the vicinity of the fingerprint sensor 110 or including the fingerprint sensor 110. A user input for controlling the fingerprint recognition-based control device 100 may include, for example, a fingerprint input and an input distinguished from the fingerprint input. According to at least one example embodiment, the fingerprint input may be received using the fingerprint sensor 110, and the input distinguished from the fingerprint input may be received from the input receiver 230 located in the vicinity of the fingerprint sensor 110 or including the fingerprint sensor 110. For example, the input receiver 230 may include a push button, a touch button, and a touch screen to receive a push input and a touch input.

According to at least some example embodiments, the input receiver 230 may also detect a motion. The motion detected by input receiver 230 may be a movement of the physical object. The motion detected by input receiver 230 may include, for example, a motion of pushing the fingerprint sensor 110 simultaneously with inputting the fingerprint, a motion of sliding in one of a plurality of directions after inputting of the fingerprint, a motion of dragging from the touch screen to the fingerprint sensor 110, and a motion of sequentially inputting fingerprints of a thumb, a forefinger and the like. The aforementioned motions are described as an example and thus, a type of the motion is not limited thereto.

The fingerprint recognition-based control device 100 may include the fingerprint sensor 110 and the input receiver 230. Also, the fingerprint recognition-based control device 100 may control the operation of the fingerprint recognition-based control device 100 based on a plurality of types of inputs including the fingerprint input, thereby enhancing a usability of the fingerprint recognition-based control device 100 and accuracy of a user authentication.

FIG. 3 illustrates the fingerprint recognition-based control device 100 according to at least one example embodiment.

FIG. 3 illustrates the fingerprint recognition-based control device 100 provided, as an example, in a form of a smart phone. However, a type of the fingerprint recognition-based control device 100 is not limited thereto. Referring to FIG. 3, an input receiver may include the first input receiver 331, the second input receiver 332, the third input receiver 333, and the fourth input receiver 334. According to at least some example embodiments, the first input receiver 331 may be a touch screen, and the second input receiver 332 and the third input receiver 333 may be touch buttons However, this disclosure is not limited thereto, and the input receiver may include at least one input receiver.

Although FIG. 3 illustrates that the fingerprint sensor 110, the first input receiver 331, the second input receiver 332, the third input receiver 333, and the fourth input receiver 334 are located on the same side of the fingerprint recognition-based control device 100, this disclosure is not limited thereto. As an alternative example, at least one of the fingerprint sensor 110, the first input receiver 331, the second input receiver 332, the third input receiver 333, and the fourth input receiver 334 may be located on a different side of the fingerprint recognition-based control device 100. According to at least some example embodiments, the fingerprint sensor 110 may be located at the fourth input receiver 334. As used herein with respect to the fingerprint sensor 110 and the fourth input receiver 334, being "located at" refers to being "in the vicinity of."

Although FIG. 3 illustrates the fingerprint sensor 110 embedded on an input side of the fourth input receiver 334, for example, a home button, of the fingerprint recognition-based control device 100 as an example, a location of the fingerprint sensor 110 is not limited thereto. The fingerprint sensor 110 may be located on, for example, a rear side and both sides of the fingerprint recognition-based control device 100, and may also be integrally provided with a screen.

Additionally, although FIG. 3 illustrates that the first input receiver 331, the second input receiver 332 and the third input receiver 333 are located on the front side of the fingerprint recognition-based control device 100 as an example, locations of the first input receiver 331, the second input receiver 332 and the third input receiver 333 are not limited thereto. The first input receiver 331, the second input receiver 332 and the third input receiver 333 may also be located on the rear side and both sides of the fingerprint recognition-based control device 100.

According to at least one example embodiment, the fingerprint sensor 110 may be located on the input side of the fourth input receiver 334, for example, a push button. According to at least one example embodiment, the fingerprint input may be received from the fingerprint sensor 110 in response to at least one of a touch motion for the fingerprint sensor 110 and a push motion for the fourth input receiver 334, and a push input may be received from the fourth input receiver 334 in response to the push motion.

Also, although FIG. 3 illustrates the first input receiver 331 as the touch screen, and the second input receiver 332 and the third input receiver 333 as touch buttons, a type of the input receiver is not limited thereto. Alternatively, each of the first input receiver 331, the second input receiver 332, and the third input receiver 333 may receive various types of inputs depending on an example. Thus, each of the first input receiver 331, the second input receiver 332, and the third input receiver 333 may include, for example, the touch button the push button, a touch pad, and a pressure sensor.

The fingerprint recognition-based control device 100 may sense a motion of a physical object based on sensor data acquired by the fingerprint sensor 110 and an input received by each of the first input receiver 331, the second input receiver 332, the third input receiver 333, and the fourth input receiver 334.

Recently, various types of sensors may be applied to a portable electronic device such as a smart phone to enhance usability. The fingerprint sensor 110 may be used in a personal electronic device for a purpose of user authentication. According to at least one example embodiment, the fingerprint sensor 110 may be included in the fingerprint recognition-based control device 100 to be used for the user authentication and utilized as an input module for controlling the fingerprint recognition-based control device 100. Also, by controlling the fingerprint recognition-based control device 100 based on, for example, an input sequence and a combination of a fingerprint input and an input of an input receiver located in a vicinity of the fingerprint sensor 110, the fingerprint recognition-based control device 100 may enhance usability of the fingerprint sensor 110 and provide a convenient manipulation method to a user. The fingerprint recognition-based control device 100 may be applied to, for example, a smart phone, a mobile device, a smart television (TV), and a smart home service.

Figure 4:
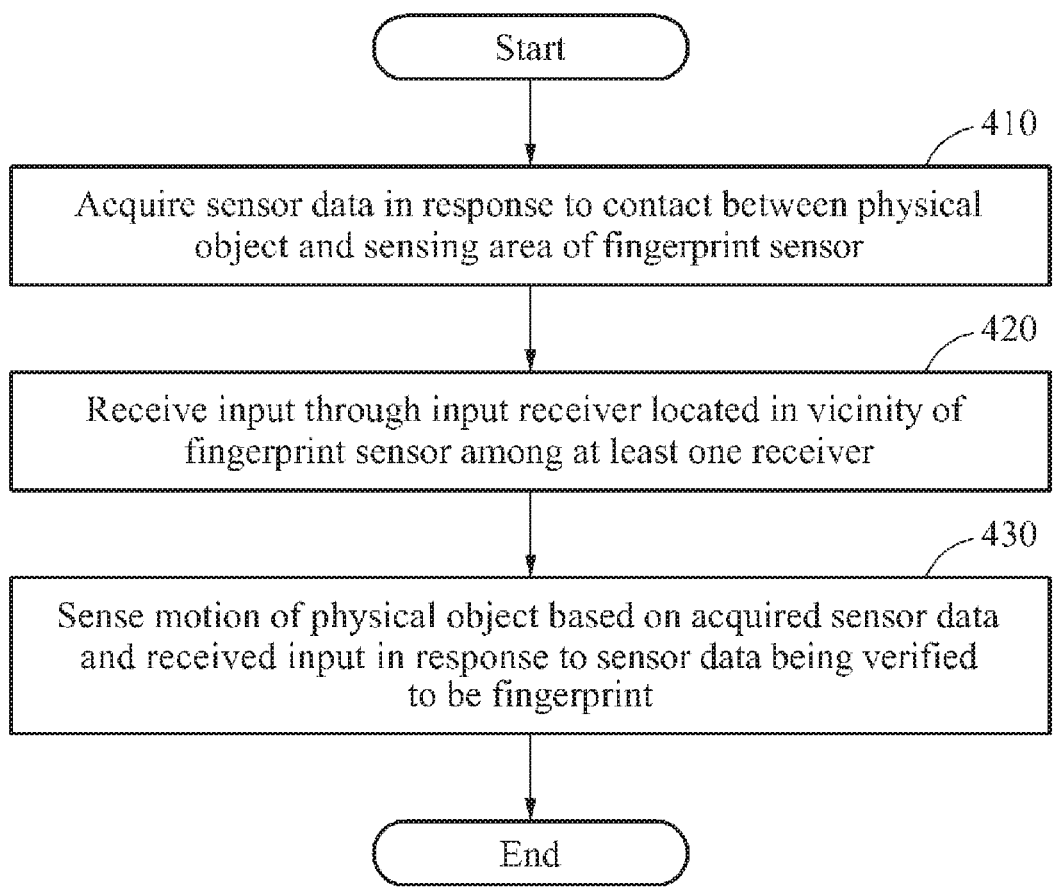
FIG. 4 illustrates an example of a fingerprint recognition-based control method according to at least one example embodiment.
Figure 5:
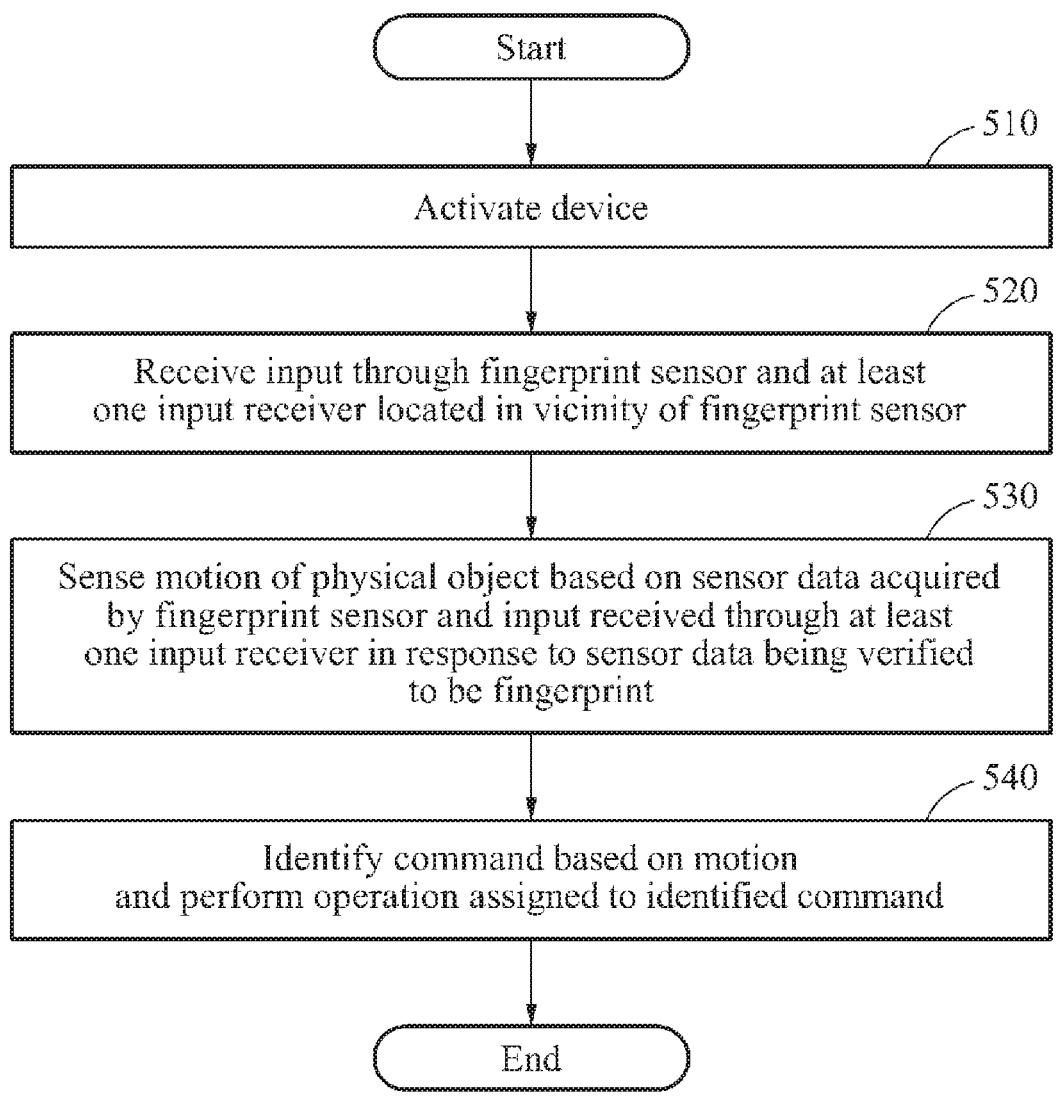
FIG. 5 illustrates another example of a fingerprint recognition-based control method according to at least one example embodiment.

FIGS. 4 and 5 illustrate examples of a fingerprint recognition-based control method according to at least one example embodiment.

FIG. 4 is a flowchart illustrating a method of sensing a motion based on sensor data received from a fingerprint sensor according to at least one example embodiment.

In operation 410, the fingerprint sensor (e.g., fingerprint sensor 110) may acquire the sensor data in response to a contact between a physical object and a sensing area of the fingerprint sensor. The fingerprint sensor may acquire the sensor data based on an example described with reference to FIG. 2. However, this disclosure is not limited thereto. According to at least one example embodiment, the fingerprint sensor may also acquire biometric data of a user in response to a contact between the physical object and a sensing area of a sensor. The sensor may sense the biometric data including, for example, at least one of fingerprint information, blood vessel information, and iris information.

According to at least one example embodiment, a processor (e.g., the processor 120) may verify whether the sensor data is a fingerprint using an image generated based on the sensor data. According to at least one example embodiment, when a feature point is extracted from the image generated based on the sensor data, the processor may determine that the sensor data is the fingerprint. Here, the fingerprint sensor may be in contact with the physical object to receive the fingerprint. However, a motion for receiving the fingerprint is not limited thereto and various types of motions, for example, rolling and swipe, may also be used to input the fingerprint to the fingerprint sensor.

In another example, the processor may verify whether the biometric data is a predetermined type of biometric information. For example, the processor may verify whether a type of the biometric data is one of a plurality of types of biometric data selected prior to the verification. A type of the biometric information may include, for example, the fingerprint, a blood vessel, and an iris. Thus, the biometric information may include various types of information associated with a living body.

In operation 420, the processor may receive an input using an input receiver located in a vicinity of the fingerprint sensor among at least one input receiver. The processor may also receive the input using an input receiver in which the fingerprint sensor is embedded.

In operation 430, the processor may sense the motion of the physical object based on the acquired sensor data and the received input in response to the sensor data being verified to be the fingerprint. According to at least one example embodiment, the processor may sense a movement of contact being made in the sensing area of the fingerprint sensor based on the sensor data. Here, the processor may extract a feature point, for example, a minutiae and a ridge flow, based on an image generated through an image processing performed on the sensor data, and sense the movement of the contact based on a movement of the feature point and information on a correlation between images.

According to at least one example embodiment, the processor may sense the motion of the physical object based on the acquired biometric data and the received input in response to the biometric data being verified to be the predetermined type of biometric information.

FIG. 5 is a flowchart illustrating a method of sensing a motion based on a fingerprint input and an input differing from the fingerprint input and performing an operation corresponding to the sensed motion in a state in which the fingerprint recognition-based control device 100 is activated. Hereinafter, the fingerprint recognition-based control device 100 may also be referred to as, for example, the device 100.

In operation 510, the device 100 may be activated. An activation of the device 100 may indicate an operation of switching a state of the device 100 from an "off" or, alternatively, low power state to a wakeup state. The device 100 may be activated in response to, for example, a manipulation of a user.

In operation 520, the device 100 may receive an input using the fingerprint sensor 110 and at least one input receiver (e.g. at least one of input receivers 230 and 331-334) located in a vicinity of the fingerprint sensor or including the fingerprint sensor. For example, the device 100 may acquire the sensor data using the fingerprint sensor 110 and receive the input through the at least one input receiver. In the present disclosure, descriptions are provided based on an example in which an input received through the at least one input receiver has a form distinguished from that of an input received by the fingerprint sensor 110. However, this disclosure is not limited thereto and thus, the at least one input receiver may also include another fingerprint sensor.

In operation 530, the processor 120 may sense a motion of the physical object based on an input received through the at least one input receiver and the sensor data acquired by the fingerprint sensor 110 in response to the sensor data being verified to be a particular fingerprint (e.g., a fingerprint registered in the device 100 as a fingerprint of an authorized user). According to at least one example embodiment, the processor may sense the motion based on a temporal relationship between the sensor data and the input, for example, the number of times that the input is received and duration of the input, and a location relationship between the input receiver and the fingerprint sensor 110, for example, a location of the input receiver relative to the fingerprint sensor 110. Also, the processor 120 may sense the motion based on at least one of a time at which the physical object makes a contact with the sensing area of the fingerprint sensor 110, a change in a location at which the contact is made, the number of times that the contact is made, and an intensity of a pressure by the contact. Descriptions related to the motion sensed based on the sensor data and the input will also be provided as an example with reference to FIGS. 6 and 7.

In operation 540, the processor 120 may identify a command based on the motion, and perform an operation assigned to the identified command. The command may be an input meaningful in a device, and provided by converting a motion of an individual to instructions used internally for the device 100. The operation may be a series of procedures performed in the device 100, and indicate an execution of a function, for example, application execution and device activation, performed in the device 100. According to at least one example embodiment, at least a portion of the operation of the device 100 may be assigned to a corresponding command by an individual or automatically assigned in advance.

Figure 6:
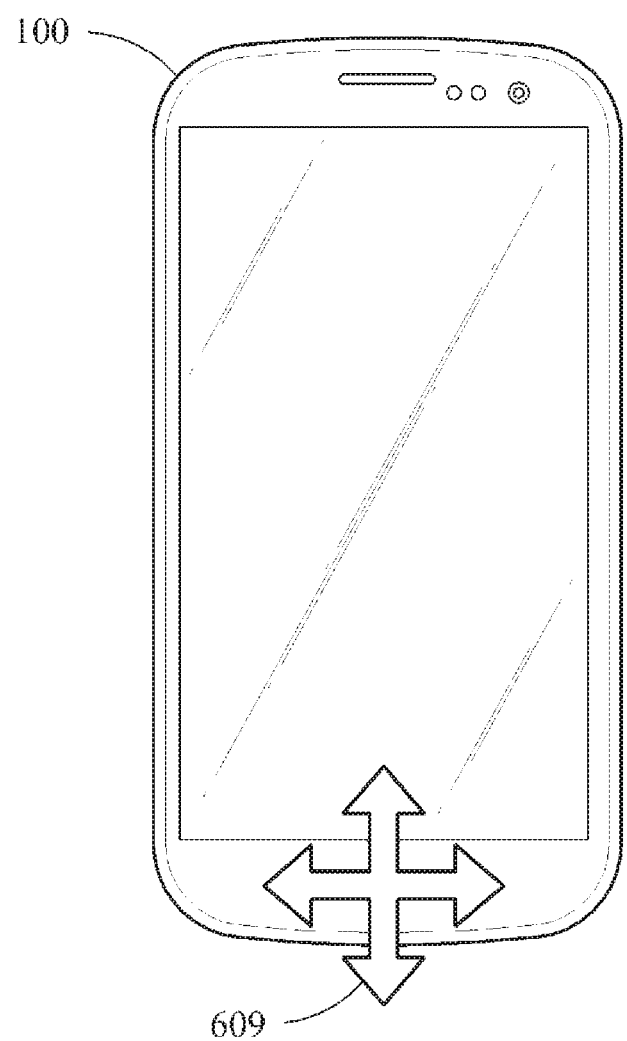
FIG. 6 illustrates an example of performing a fingerprint recognition-based control according to at least one example embodiment.
Figure 7:
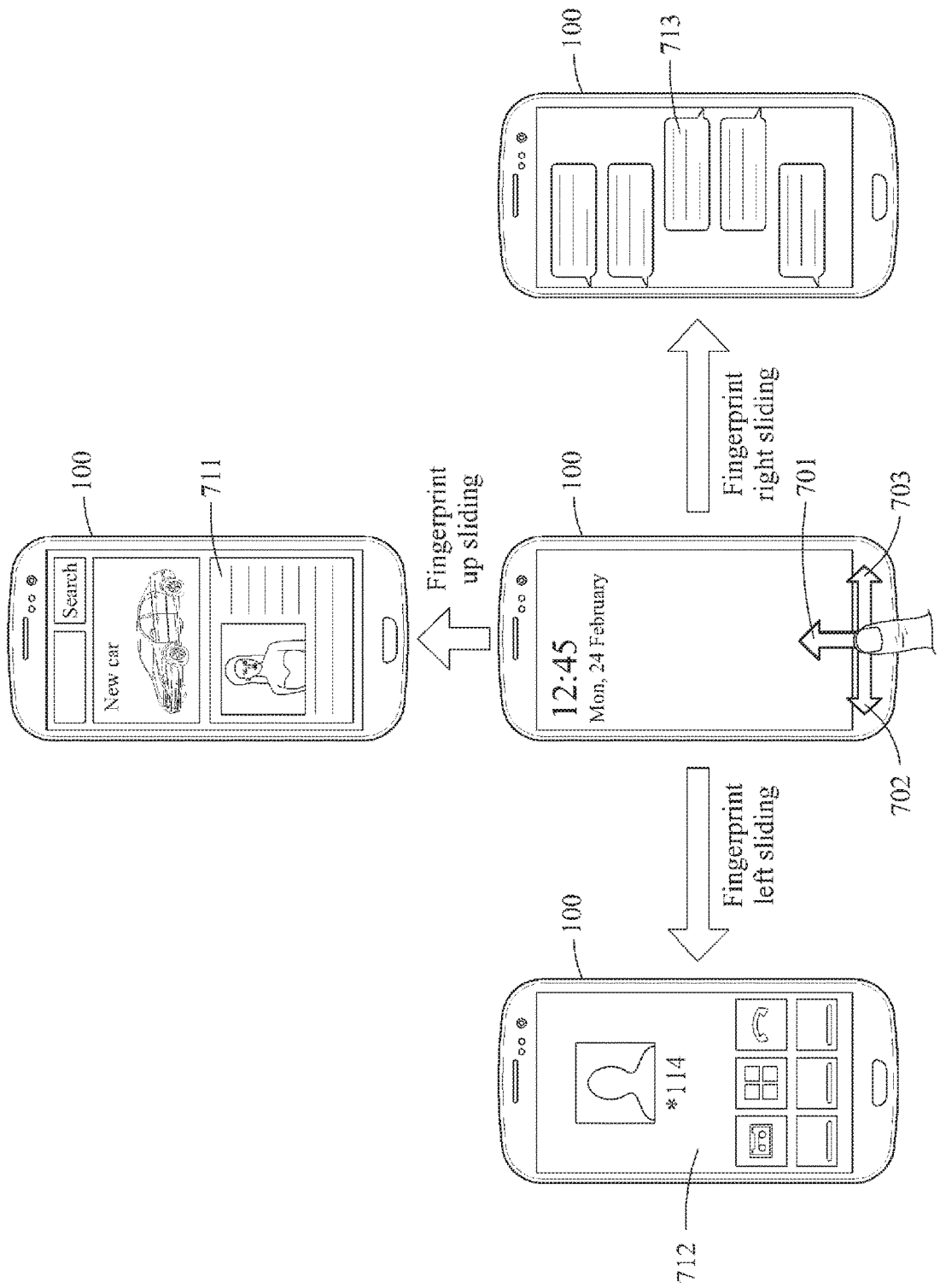
FIG. 7 illustrates another example of performing a fingerprint recognition-based control according to at least one example embodiment.

FIGS. 6 and 7 illustrate examples of performing a fingerprint recognition-based control according to at least one example embodiment.

FIG. 6 illustrates an example of a fingerprint recognition-based control performed by an individual.

According to at least one example embodiment, a processor of the fingerprint recognition-based control device 100 may sense a motion based on a location relationship between a fingerprint sensor and an input receiver receiving an input among at least one input receiver.

For example, the processor 120 may determine the motion as a first direction slide in response to an input received by a first input receiver located in a first direction relative to the fingerprint sensor 110 when the fingerprint sensor 110 acquires the sensor data. Also, the processor may determine the motion as a second direction slide in response to an input received by a second input receiver located in a second direction relative to the fingerprint sensor 110 when the fingerprint sensor 110 acquires the sensor data. The first direction and the second direction may indicate a predetermined direction based on the fingerprint sensor 110. Although FIG. 6 illustrates the first direction and the second direction as, for example, up, down, left, and right directions 609 among two dimensional directions relative to a position of the fingerprint sensor 110 on a plane on which the fingerprint sensor 110 is present as well, the disclosure is not limited thereto. Thus, the first direction and the second direction may be, for example, any two-dimensional (2D) direction and a three-dimensional (3D) direction.

An order of the input is not limited to the foregoing and thus, the input may also be received through the input receiver earlier than the sensor data of the fingerprint sensor. For example, the processor 120 may determine the motion as the first direction slide in response to the sensor data being acquired by the fingerprint sensor located in the first direction relative to the first input receiver when the input is received in the first input receiver. Also, the processor 120 may determine the motion as the second direction slide in response to the sensor data acquired by the fingerprint sensor 110 disposed in the second direction relative to the second input receiver when the input is received in the second input receiver. Here, the first direction and the second direction may indicate predetermined directions relative to the first input receiver and the second input receiver, respectively.

The aforementioned term "slide" may indicate a motion of the physical object making contact with the fingerprint recognition-based control device 100 and moving in a predetermined direction by at least a predetermined distance while maintaining the contact. The first direction slide may indicate a motion of moving contact between the physical object and the fingerprint recognition-based control device 100 in the first direction, and the second direction slide may indicate the motion of moving contact in the second direction. For example, in response to contact being made, the processor 120 may sense the motion based on the motion of moving contact irrespective of an intensity of a pressure applied by the physical object to the fingerprint recognition-based control device 100.

According to at least some example embodiments, the processor 120 may sense the motion based on the sensor data, a first input received through the first input receiver of the at least one input receiver, and a second input received through the second input receiver of the at least one input receiver. Here, the motion may include the motion, for example, a slide motion and a rotation motion, of the motion of moving contact between the physical object and the fingerprint recognition-based control device 100 based on a predetermined trajectory, and a motion made for various types of inputs, for example, a touch input, a push input, a toggle input, and a dial input, for the fingerprint sensor 110 or the input receiver of the fingerprint recognition-based control device 100. The trajectory may be formed in, for example, a 2D shape such as a circle, an oval, a square, and a triangle. However, a form of the trajectory is not limited thereto. When at least one of the fingerprint sensor 110, the first input receiver, and the second input receiver is disposed on a different side of the fingerprint recognition-based control device 100, the trajectory may also be formed in a 3D shape.

According to at least one example embodiment, the fingerprint recognition-based control device 100 may sequentially receive the sensor data generated by moving the contact between the physical object and the fingerprint recognition-based control device 100, the first input of the first input receiver, and the second input of the second input receiver based on an order of inputs received from the physical object to the fingerprint sensor 110, the first input receiver, and the second input receiver. Based on the sensor data, the first input, and the second input, the fingerprint recognition-based control device 100 may sense the motion performed based on the predetermined trajectory. The processor 120 may also sense the motion made for various types of inputs, for example, the touch input, the push input, the toggle input, and the dial input generated while the contact between the physical object and the fingerprint recognition-based control device 100 moves based on the predetermined trajectory.

FIG. 7 illustrates an example of performing a motion assigned to a command identified based on a sensed motion.

According to at least one example embodiment, the fingerprint recognition-based control device 100 may sense a movement of contact between the physical object and the fingerprint sensor 110 in the sensing area and a movement of contact between the physical object and an input receiver located in a vicinity of the fingerprint sensor 110 or including the fingerprint sensor 110.

According to at least one example embodiment, a motion of the physical object, for example, a finger moving in up, down, left, and right directions while touching the fingerprint sensor 110 one time or pushing of the fingerprint sensor 110 may occur. When the moving occurs only in the sensing area of the fingerprint sensor 110, the sensor data of the fingerprint sensor 110 may be tracked to compute fingerprint movement information while a fingerprint authentication is being performed.

According to at least one other example embodiment, when an input is received in the fingerprint sensor 110 and the input receiver located in the vicinity of the fingerprint sensor 110 or including the fingerprint sensor 110, the fingerprint authentication may be performed and a motion may be sensed based on the input of the input receiver, thereby verifying whether the motion is valid. Here, a valid motion may be, for example, a motion to which an operation corresponding to a command identified based on the sensed motion is assigned in advance.

In FIG. 7, when the physical object makes a leftward sliding motion 702 relative to the fingerprint sensor 110, an input may be received in the fingerprint sensor 110 and a touch button disposed on the left of the fingerprint sensor 110. In response to an upward sliding motion 701, the input may be received from a touch screen. According to at least one example embodiment, a predetermined application may be set to be executed based on a fingerprint of a user and a trajectory of a motion, for example, a direction and a figure of the motion.

In FIG. 7, an Internet browser execution operation may be assigned to a command identified based on a corresponding motion such that an Internet browsing function 711 is executed when the upward sliding motion 701 is sensed. A call connection execution operation may be assigned to a command identified based on a corresponding motion such that a call connection function 712 is executed when the leftward sliding motion 702 is sensed. A message function execution operation may be assigned to a command identified based on a corresponding motion such that a message function 713 is executed when a rightward sliding motion 703 is sensed. However, this disclosure is not limited thereto. Alternatively, each directional sliding motion may be assigned to execute, for example, a contact application, a favorites menu, the most recently used menu, and a direct call connection to a desired contact as well as the call connection function 712, the message function 713, and the Internet browsing function 711. The command and the operation assigned to the command are not limited to the foregoing. Depending on an example, corresponding commands may be identified from various types of motions, and various operations executable in the fingerprint recognition-based control device 100 may be assigned to the corresponding commands.

Also, a mapping of a motion to an operation may be different for each fingerprint identification (ID) when the physical object is a finger. According to at least one example embodiment, a movement of a fingerprint on a thumb may be applied to execute a direct call connection to a contact of a corresponding direction, for example, a first desired contact for a first direction. Similarly, a movement of a fingerprint on a forefinger may be applied to be a hot key for a paid service. However, this disclosure is not limited thereto. Depending on an example, various motions and various operations may be mapped for each fingerprint ID.

According to at least one example embodiment, in terms of an application for a paid service, a device may simultaneously perform a user authentication and execute the application by verifying a fingerprint input and sensing a motion. According to at least one example embodiment, the device 100 may be set to execute a video streaming application, a call connection, and an access to a web site which are provided through a paid data communication, based on the verified fingerprint and the sensed motion.

Figure 8:
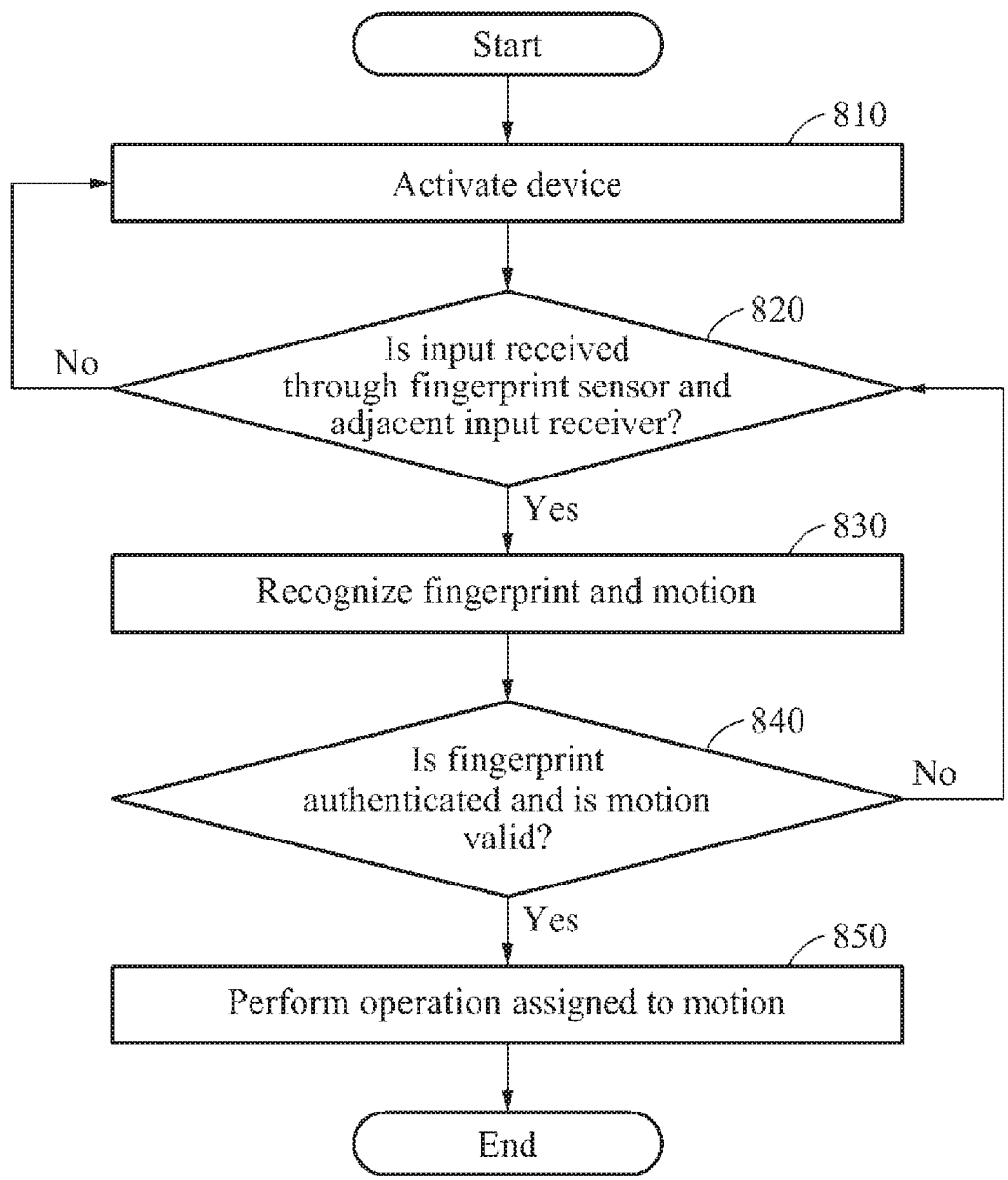
FIG. 8 illustrates still another example of a fingerprint recognition-based control method according to at least one example embodiment.
Figure 9:
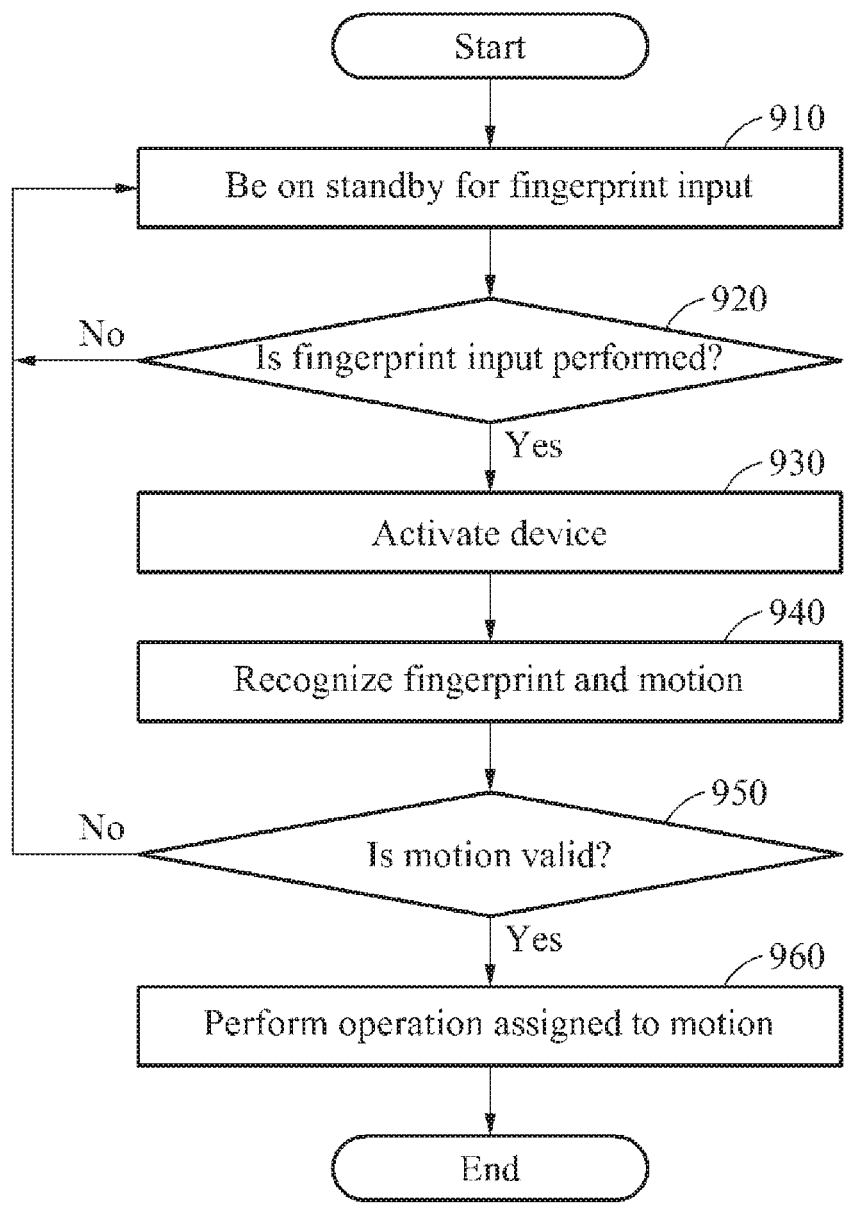
FIG. 9 illustrates yet another example of a fingerprint recognition-based control method according to at least one example embodiment.
Figure 10:
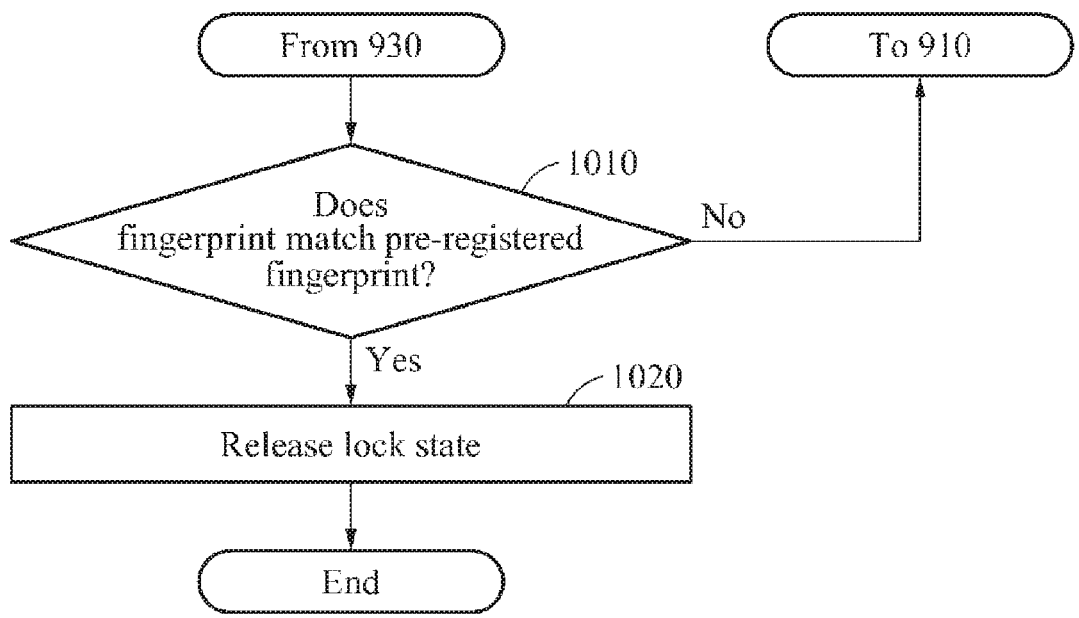
FIG. 10 illustrates further another example of a fingerprint recognition-based control method according to at least one example embodiment.

FIGS. 8 through 10 illustrate examples of a fingerprint recognition-based control method according to at least one example embodiment.

FIG. 8 is a flowchart illustrating a method of sensing a motion using a fingerprint sensor and an input receiver including the fingerprint sensor or located in a vicinity of the fingerprint sensor in a state in which a device is activated.

In operation 810, a device may be activated. For example, a user may activate the device 100 and power on a display of the device 100. According to at least one example embodiment, the state in which the device 100 is activated may indicate a state in which the device 100 is powered on and functions of the display and the device 100 are executable or currently being used.

In operation 820, the processor 120 may determine whether an input is received by the fingerprint sensor and the input receiver including the fingerprint sensor or located in the vicinity of the fingerprint sensor. For example, the processor 120 may verify the sensor data acquired by the fingerprint sensor, and the input received by the input receiver including the fingerprint sensor or located in the vicinity of the fingerprint sensor.

In operation 830, the processor 120 may recognize a fingerprint and a motion. For example, the device 100 may recognize, within the acquired sensor data, a fingerprint. For example, in response to the acquired sensor data and the received input, the processor 120 may generate an image corresponding to the recognized fingerprint based on the sensor data and sense the motion based on the sensor data and the input.

In operation 840, the processor 120 may perform a fingerprint authentication and verify whether the motion is valid. For example, the processor 120 may verify whether the sensor data (e.g., the recognized fingerprint) matches a pre-registered fingerprint based on the generated image, and verify whether the sensed motion corresponds to a pre-registered motion. Also, the processor 120 may determine whether a combination between the recognized fingerprint and the sensed motion corresponds to one of a plurality of combinations that have been assigned to commands, for example, in a command mapping table stored in the device 100, and may verify an operation assigned to the command in advance.

In operation 850, the processor 120 may perform the operation assigned to the motion. For example, the processor 120 may convert the command identified in operation 840 to instructions and execute the instructions, thereby performing the operation assigned to the command.

FIG. 9 illustrates a method of sensing a motion using a fingerprint sensor and an input receiver including the fingerprint sensor or located in a vicinity of the fingerprint sensor while a device is in a power saving mode.

In operation 910, the fingerprint sensor 110 of the device 100 may be on standby for an input of a fingerprint. For example, the fingerprint sensor 110 may be on standby until contact is made between a physical object and the sensing area while operating using a low power. According to at least one example embodiment, the fingerprint sensor 110 may be on standby for the input while the device 100 is in the power saving mode or an idle state and the fingerprint sensor 110 is constantly in an on state.

In operation 920, the fingerprint sensor 110 may verify whether a fingerprint input is performed. The fingerprint sensor 110 may acquire sensor data in response to contact being made between the physical object and the sensing area of the fingerprint sensor 110, generate an image based on the acquired sensor data, and verify whether the image generated based on the acquired sensor data corresponds to a fingerprint.

According to at least one example embodiment, the device 100 may proceed from operation 920 to operation 930 when the device 100 determines the acquired sensor data (e.g., the generated image) corresponds to a fingerprint, and the device 100 may proceed to step 910 when the device 100 decides the acquired sensor data (e.g., the generated image) does not correspond to a fingerprint.

Alternatively, according to at least one example embodiment the device 100 may proceed from operation 920 to operation 930 only when the device 100 determines the acquired sensor data (e.g., the generated image) corresponds to a pre-registered fingerprint, and the device 100 may proceed to step 910 when the device 100 decides the acquired sensor data (e.g., the generated image) does not correspond to a pre-registered fingerprint (e.g., when the acquired sensor data is determined to correspond to a non-registered fingerprint or the acquired sensor data is not determined to correspond to a fingerprint) The pre-registered fingerprint may be, for example, a fingerprint registered by a user prior to operation 920. The pre-registered fingerprint may be stored, for example, in the device 100 or a device accessible by the device 100.

In operation 930, the processor 120 may activate the device 100.

For example, the processor 120 may activate the device 100 in response to the sensor data being verified to be a fingerprint in operation 920. According to at least one example embodiment, in operation 930 the device 100 and the display of the device 100 may change to a wakeup state. The wakeup state may be a state in which the device 100 is capable of the processor 120 recognizing fingerprint input and/or sensing a motion.

In operation 940, the processor 120 may recognize the fingerprint and the motion. For example, the device 100 may recognize, within the acquired sensor data, a fingerprint, as is discussed above with respect to operation 920. For example, in response to the acquired sensor data and the received input, the processor 120 may generate an image corresponding to the recognized fingerprint based on the sensor data, and sense the motion based on the sensor data and the input. As an alternative to generating an image corresponding to the recognized fingerprint in operation 940, the device 100 may, in operation 940, use the image of the acquired data generated in operation 920.

In operation 950, the processor 120 may determine whether the motion is valid. For example, similarly to operation 840 of FIG. 8, the processor 120 may determine whether a combination between the verified fingerprint and the sensed motion is corresponds to one of a plurality of combinations that have been assigned to commands, for example, in a command mapping table stored in the device 100, and verify an operation assigned to the command in advance.

In operation 960, the processor 120 may perform the operation assigned to the motion. For example, the processor 120 may convert the command identified in operation 950 to instructions and execute the instructions, thereby performing the operation assigned to the command.

FIG. 10 illustrates a method of releasing a lock state based on whether a fingerprint is matched or non-matched (e.g., whether a fingerprint matches, or does not match, with a fingerprint registered in the device 100).

As described with reference to operation 910 of FIG. 9, an initial state of the fingerprint sensor 110 may be a standby state while operating using a low power. Also, an initial state of the greater part of the device 100 including the display may be an idle state or a power saving mode. As is discussed above, according to at least some example embodiments, when user input received by the fingerprint sensor in operation 920 is determined to be a fingerprint (i.e., any fingerprint or, alternatively, a fingerprint matching a pre-registered fingerprint), the device 100 may proceed to operation 930 which may include changing the greater part of the display to an operable state.

In operation 1010, the processor 120 may determine whether the sensor data acquired by the finger sensor 110 in operation 920 matches a pre-registered fingerprint. For example, the processor 120 may determine whether a fingerprint included in the acquired sensor data matches the pre-registered fingerprint when the sensor data acquired by the fingerprint sensor 110 is determined (e.g., by the processor 120) to include a fingerprint. The term pre-registered fingerprint, as used in the present disclosure, may refer to a fingerprint registered by a user in advance of an authorization operation, for example, using a registration process that includes, for example, registering (i.e., storing) the fingerprint of the user in a retrievable manner (e.g., storing the fingerprint of the user in the device 100 or another device accessible by the device 100).

In operation 1020, the processor may release a lock state of the device 100 in response to the fingerprint being verified to be the pre-registered fingerprint, for example, as the result of a comparison operation that includes comparing an input fingerprint to the pre-registered fingerprint (e.g., by comparing an image of the input fingerprint to an image of the pre-registered fingerprint).

According to at least one example embodiment, when the input fingerprint is the non-registered fingerprint, the processor may provide a guidance and request for a user authentication, or may set at least a portion of a function performed irrespective of the user authentication to be executable. Alternatively, when the input fingerprint is the non-registered fingerprint, the processor may be on standby for an input of the fingerprint by returning to operation 910 as illustrated in FIG. 10.

Figure 11:
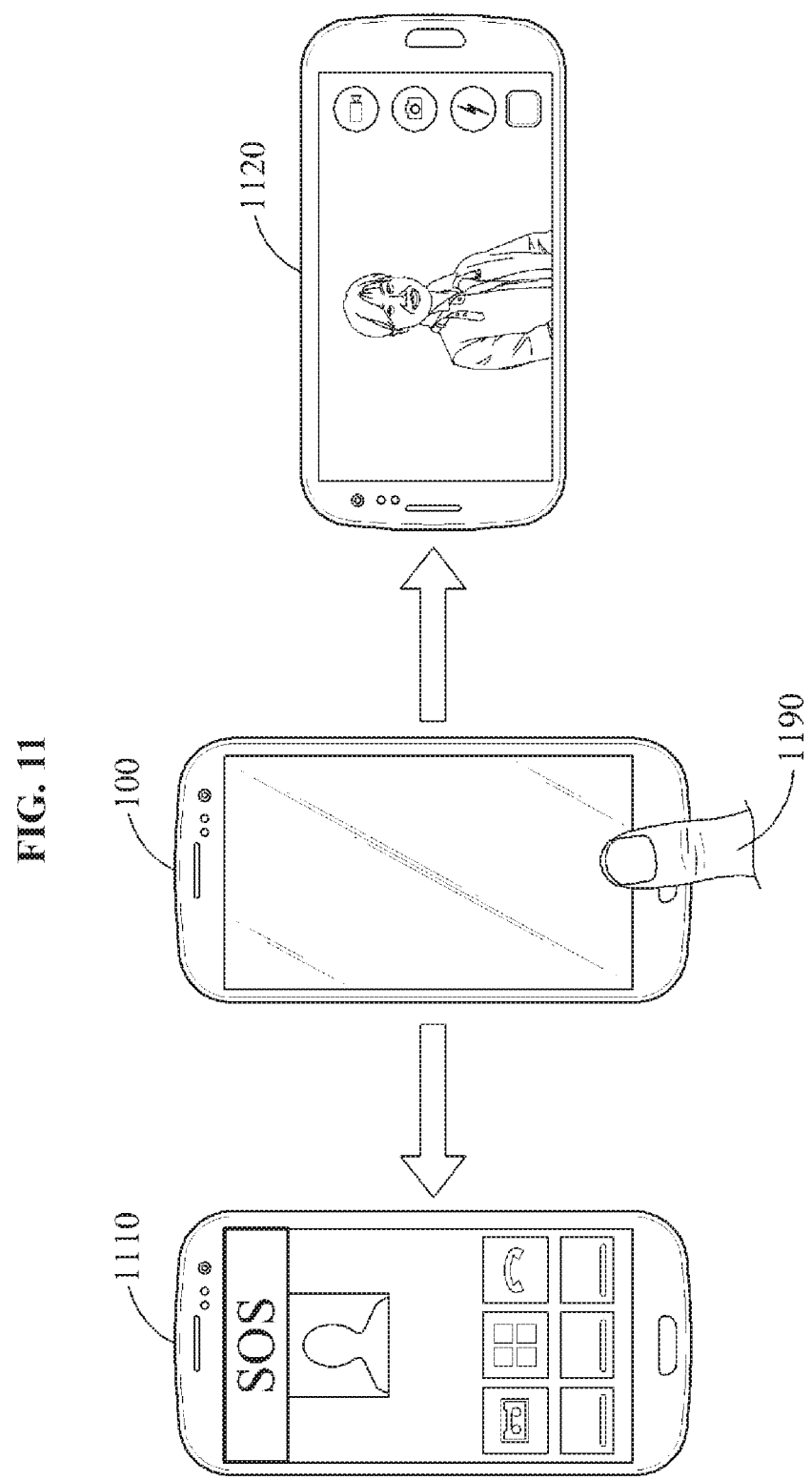
FIG. 11 illustrates still another example of performing a fingerprint recognition-based control according to at least one example embodiment.

FIG. 11 illustrates an example of performing a fingerprint recognition-based control according to at least one example embodiment.

According to at least one example embodiment, a processor may determine whether an input fingerprint matches a pre-registered fingerprint in response to sensor data being verified to be a fingerprint. The processor 120 may perform an operation assigned to a command identified based on a motion of a physical object in response to the input fingerprint matching the pre-registered fingerprint. The processor 120 may perform the operation assigned to the command identified based on the motion by restricting at least a portion of the operation in response to the input fingerprint differing from the pre-registered fingerprint.

According to at least one example embodiment, the operation may be assumed to be a photo gallery service. When a predetermined motion is identified, the processor 120 may provide the photo gallery service using various methods based on whether the fingerprint is registered. When the input fingerprint matches the pre-registered fingerprint, the processor 120 may, for example, allow an access to any photograph in a photo gallery (e.g., a photo gallery stored on device 100). When the input fingerprint differs from the pre-registered fingerprint, for example, when the input fingerprint is a non-registered fingerprint, the processor may allow an access to a few photographs in the photo gallery and block an access to the other photographs. Also, when the fingerprint is the non-registered fingerprint, the processor 120 may not provide the photo gallery service depending on an example.

According to at least one other example embodiment, the processor 120 may authorize an operation of a higher security level to be allowed in response to an input of the pre-registered fingerprint when compared to the non-registered fingerprint. The processor 120 may authorize a protected operation to be performed in response to the sensor data being verified to be the pre-registered fingerprint. When the operation assigned to the command identified based on the motion is the protected operation, the processor 120 may perform the protected operation based on the authorizing. Hereinafter, descriptions related to an example of authorizing the protected operation will be provided with reference to FIG. 11.

According to at least one example embodiment, the fingerprint recognition-based control device 100 may execute a predetermined function of the fingerprint recognition-based control device 100 based on a motion, for example, a push motion, accompanied by the fingerprint input. According to at least one example embodiment, the processor 120 may execute a different function based on a user fingerprint authentication result received by the fingerprint recognition-based control device 100 in an activated state and a type of a motion sensed by at least one of an input receiver and the fingerprint sensor 110. According to at least one other example embodiment, when the fingerprint recognition-based control device 100 is switched from the idle state or the power saving mode to a wakeup state in response to the fingerprint input, the processor 120 may identify the command based on the sensed motion and perform the operation assigned to the command.

For example, FIG. 11 illustrates that the fingerprint recognition-based control device 100 performing a fingerprint authentication and an operation in response to a motion of the physical object 1190. Each of a device 1110 on the left of the fingerprint recognition-based control device 100 and a device 1120 on the right of the fingerprint recognition-based control device 100 may perform an operation in response to a sensing of a different motion. According to at least one example embodiment, the device 1110 may perform an operation in response to a long touch motion, for example, a touch motion maintained for at least a predetermined period of time. The device 1120 may perform an operation when a push motion is performed twice. However, types of the motion and operation are not limited thereto. Depending on an example, various types of motions may be mapped for each operation, and the operation may include various operations of the device 100.

In FIG. 11, the device 1110 may perform a function to make an SOS call in response to the long touch motion and the fingerprint input received from the physical object 1190. Also, the device 1120 may execute a camera function in response to the fingerprint input of the physical object 1190 and the push motion performed twice.

Furthermore, a range of authorization with respect to the fingerprint recognition-based control device 100 may vary based on a user authentication result related to the fingerprint input. According to at least one example embodiment, when the input fingerprint is determined to be the pre-registered fingerprint as a result of the fingerprint authentication, the range of authorization may be set such that the user corresponding to the input fingerprint is enabled to freely uses another function, for example, an access to an album storing previous photographs, of the fingerprint recognition-based control device 100 as well as the camera function. In contrast, when the input fingerprint is the non-registered fingerprint, a function of the fingerprint recognition-based control device 100 may be executed restrictively.

Figure 12:
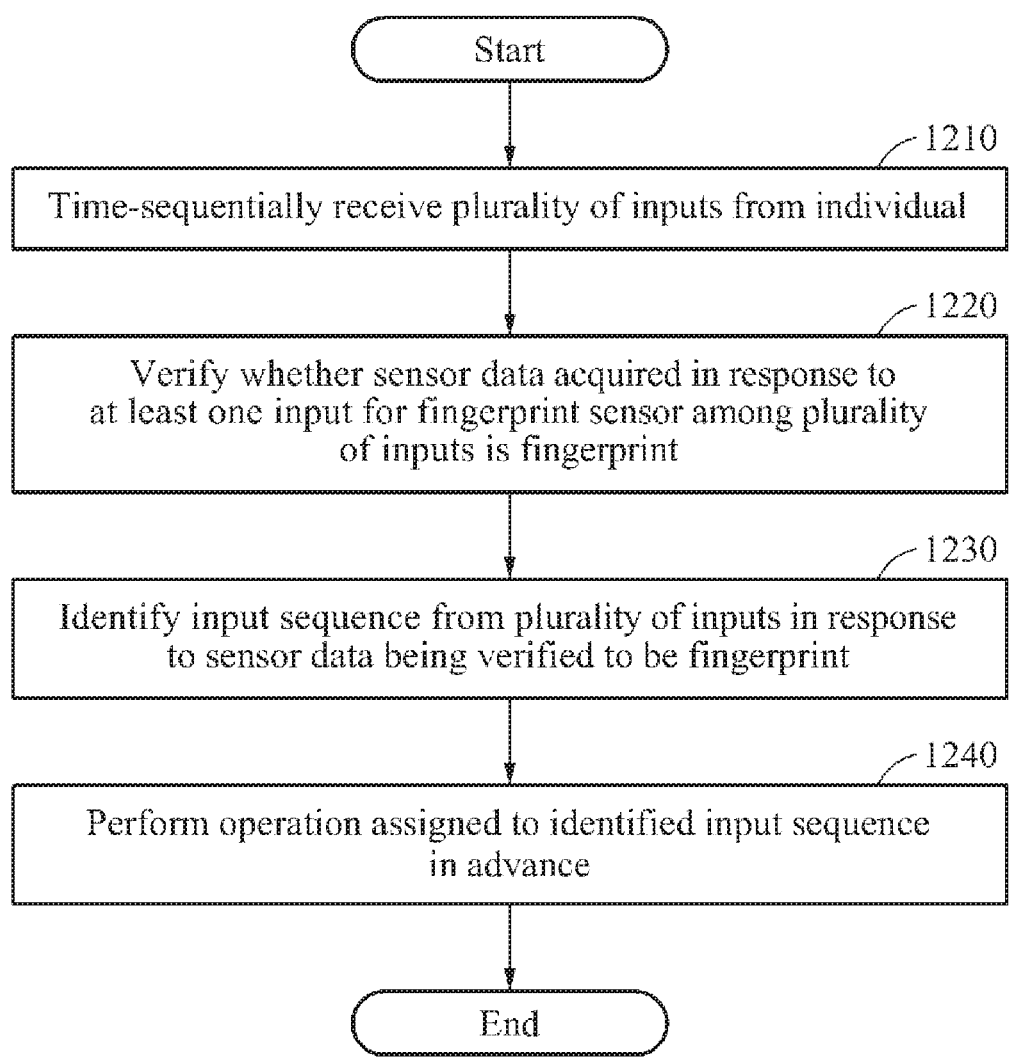
FIG. 12 illustrates still another example of performing a fingerprint recognition-based control method according to at least one example embodiment.

FIG. 12 illustrates an example of performing a fingerprint recognition-based control method according to at least one example embodiment.

According to at least one example embodiment, when at least one fingerprint is registered in the device, and when a plurality of fingerprints including a registered fingerprint are input in a predetermined sequence, an operation to be performed may be verified based on whether the fingerprints are authenticated and an input sequence indicating the sequence of the fingerprints. However, this disclosure is not limited thereto. Alternatively, the input sequence corresponding to a reference for verifying the operation to be performed may include at least one of a registered fingerprint, a non-registered input (e.g., a non-registered fingerprint), and an input distinguished from the fingerprint. Related descriptions will be provided in detail with reference to operations 1210 through 1240.

In the present disclosure, the input sequence may be stored, automatically or by a user, in a device in advance (e.g., the device 100). Also, the input sequence may indicate an ordinal position at which a predetermined input is to be input. According to at least one example embodiment, the input sequence may include at least one fingerprint input, and a fingerprint input included in the input sequence may be a pre-registered fingerprint. According to at least one example embodiment, when a user registers fingerprints of a thumb and a forefinger, the input sequence may include a fingerprint sequence of, for example, the thumb, the thumb, the forefinger, and the thumb, and the fingerprint sequence may be used to be a cipher pattern. The aforementioned descriptions are provided as an example and thus, a length and an order of the input sequence, a type of input in the input sequence, a type of motion matching the input sequence, and the like will vary depending on an example.

The input sequence may include at least one pre-registered fingerprint and an additional predetermined input.

Here, a predetermined input may include, for example, a non-registered fingerprint and an input to be received from an input receiver including the fingerprint sensor or being located in a vicinity of the fingerprint sensor. According to at least one example embodiment, when the user registers the fingerprints of the thumb and the forefinger, the input sequence may be set to be a sequence of, for example, the thumb, the thumb, a predetermined fingerprint, and the forefinger. In contrast, when inputs are time-sequentially received from an individual in order of the thumb, the thumb, a middle finger, and the forefinger, the processor 120 may determine that the input sequence is input appropriately. In this example, the fingerprints of the thumb and the forefinger may be the pre-registered fingerprint, and a fingerprint of the middle finger may be the non-registered fingerprint. As such, the input sequence may include a finger of the non-registered fingerprint to increase the complexity of the cipher of the input sequence. Through this, a security level may be enhanced while an amount of memory and the number of computations for the fingerprint authentication remain the same.

In operation 1210, a device may time-sequentially receive a plurality of inputs from an individual. For example, the device 100 may time-sequentially receive a plurality of items of sensor data from a fingerprint sensor (e.g., fingerprint sensor 110). Also, the device 100 may time-sequentially receive at least one item of sensor data from the fingerprint sensor 110 and at least one input from at least one input receiver including the fingerprint sensor 110 or being located in a vicinity of the fingerprint sensor 110.

In operation 1220, the device 100 may verify whether sensor data acquired in response to at least one input for the fingerprint sensor 110 among the plurality of inputs is a fingerprint.

In operation 1230, the device 100 may identify an input sequence from the plurality of inputs in response to the sensor data being verified to be the fingerprint.

According to at least one example embodiment, the device 100 may determine whether at least one predetermined ordinal input among the plurality of inputs received time-sequentially is a predetermined or, alternatively, desired input. For example, when a user inputs a predetermined or, alternatively, desired input at a predetermined or, alternatively, desired ordinal position, the device 100 may verify that the user inputs an input sequence including a predetermined or, alternatively, desired ordinal input.

According to at least one example embodiment, the device 100 may determine whether the at least one item of sensor data acquired by the fingerprint sensor 110 matches a pre-registered fingerprint, and determine whether the at least one input received from the at least one input receiver including the fingerprint sensor 110 or being located in the vicinity of the fingerprint sensor 110 is a predetermined input. For example, the input sequence may include the pre-registered fingerprint and the predetermined or, alternatively, desired input irrespective of an order. When the user inputs the pre-registered fingerprint and the predetermined or, alternatively, desired input to the device 100 irrespective of the order, the device 100 may verify that the user inputs the aforementioned input sequence.

Also, when the at least one predetermined or, alternatively, desired ordinal input is the predetermined input, the device 100 may identify the input sequence and ignore an input other than the at least one predetermined or, alternatively, desired ordinal input. According to at least one example embodiment, when the user performs a predetermined or, alternatively, desired ordinal input, for example, a $(k-1)^{th}$ input and a $(k+1)^{th}$ input, on an input sequence in which a $k^{th}$ input is set to be a fingerprint input, the device 100 may identify the input sequence based on the $k^{th}$ input and ignore an input other than the $k^{th}$ input. In this example, the predetermined ordinal input is not limited to the foregoing and thus, any ordinal input other than the $k^{th}$ input is applicable thereto.

According to at least one example embodiment, the device 100 may determine a first predetermined or, alternatively, desired ordinal input among the plurality of inputs received in time series is the pre-registered fingerprint, and may determine a second predetermined or, alternatively, desired ordinal input among the plurality of inputs received in time series is a non-registered fingerprint. For example, the input sequence may include a predetermined or, alternatively, desired input in order of, for example, the pre-registered fingerprint and the non-registered fingerprint. The number of pre-registered fingerprints, the number of non-registered fingerprints, and an order of the pre-registered fingerprints and non-registered fingerprints are not limited to the foregoing and thus, will be provided through various combinations depending on an example.

According to at least one example embodiment, the device 100 may determine whether each of the plurality of inputs is received as a corresponding predetermined or, alternatively, desired motion. For example, the input sequence may be used as a cipher to unlock the device 100. Also, a matching between the motion and the input sequence including the fingerprint input may be performed and then, the input sequence may be stored to increase a complexity of the cipher. For example, the fingerprint and one directional sliding motion may be input at an $m^{th}$ input included in the input sequence.

In operation 1240, the device 100 may perform an operation assigned to the identified input sequence in advance. For example, an operation to be performed may be assigned with respect to a pre-stored input sequence in advance. When the input sequence is identified the device 100 may generate a command corresponding to the identified input sequence and perform an operation assigned to the corresponding command.

According to at least one example embodiment, the input sequence including the fingerprint input may also be applicable to, for example, data and a function requiring an additional user authentication in the device 100 while the device 100 is in an unlock state.

FIG. 13 illustrates an example of a fingerprint recognition-based control device according to at least one example embodiment.

Referring to FIG. 13, the fingerprint recognition-based control device 100 may include the fingerprint sensor 110, an input processor 1320, the input receiver 230, a controller 1340, and a display 1350.

An input signal may be generated through contact or pressure being made with a finger of a user in the fingerprint sensor 110. For example, a capacitive sensing scheme, an electric field sensing scheme, and an ultrasonic wave sensing scheme may be applied to the fingerprint sensor 110.

The input processor 1320 may verify meanings of input signals generated in the fingerprint sensor 110 and the input receiver 230.

As illustrated in FIG. 13, the input processor 1320 may include a fingerprint recognizer 1321 to perform a recognition computation on a fingerprint input of the fingerprint sensor 110. The fingerprint recognizer 1321 may recognize a fingerprint to verify, for example, whether the input signal is a fingerprint and whether the input signal is a registered fingerprint. Also, the fingerprint recognizer 1321 may register a plurality of fingerprint images for at least one finger and identify a finger corresponding to the registered fingerprint. According to at least one example embodiment, when an input signal of the fingerprint has a motion of moving or rotating in a predetermined direction, forming a predetermined shape, and the like, the fingerprint recognizer 1321 may also sense the motion in response to the fingerprint input.

An input verifier 1322 of the input processor 1320 may verify a meaning of an input motion from a touch button 1331, a touch screen 1332, and a push button 1333, for example, a tactile button, as well as a result of fingerprint recognition. When an individual inputs a fingerprint and a signal is generated in the input receiver 230, the input verifier 1322 may verify a combination of an input and sensor data resulting from the fingerprint. The input verifier 1322 may verify whether the result of fingerprint recognition is a valid input for controlling the fingerprint recognition-based control device 100 based on information indicating whether the result of the fingerprint recognition corresponds to a registered user, and a type of an input of the input receiver 230 including the fingerprint sensor 110 or being located in a vicinity of the fingerprint sensor 110. When the fingerprint and the recognized motion are valid, the input verifier 1322 may generate a command in response thereto.

According to at least one example embodiment, the input verifier 1322 may identify, as a motion, a touch motion performed at least one time for inputting a fingerprint, for example, an input sequence of at least two inputs, a slide motion performed in one of left, right, up, and down directions to the touch button 1331 in response to a fingerprint touch input, a slide motion starting from the touch button toward the fingerprint sensor 110, a long touch motion performed on the fingerprint sensor 110, and the like. However, a type of the motion is not limited thereto.

Based on the aforementioned command, the controller 1340 may perform an operation assigned to a corresponding command. Functions of the fingerprint recognition-based control device 100 may be executed based on a fingerprint recognition input, and the display 1350 may display a screen based on the operation performed by the controller 1340.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

For example, the device 100 may include a memory storing computer-readable instructions (e.g., one or more programs) and a processor (e.g., the processor 120 or 1320) configured to execute the computer-readable instructions. The computer-readable instructions stored in the memory may include instructions for causing the processor to perform any or all operations described in the present disclosure as being performed by the device 100, or an element thereof.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A fingerprint recognition-based control method comprising:
   acquiring, by a fingerprint sensor, sensor data in response to a contact between a physical object and a sensing area of the fingerprint sensor;
   receiving an input through a first input receiver from among one or more input receivers, the first input receiver being located in a vicinity of the fingerprint sensor;
   verifying the sensor data to be an input fingerprint; and
   sensing a motion of the physical object based on the acquired sensor data and the received input, in response to a positive result of the verifying,
   wherein the sensing comprises:
   determining the motion to be a first direction slide in response to the sensor data acquired by the fingerprint sensor being located in a first direction relative to an input receiver, from among the one or more input receivers, that receives input.

2. The method of claim 1, further comprising:
   identifying a command based on the motion and performing an operation assigned to the identified command.

3. The method of claim 1, wherein the first input receiver is an input receiver in which the fingerprint sensor is embedded.

4. The method of claim 1, wherein the sensing comprises:
   sensing the motion based on a location relationship between the fingerprint sensor and the first input receiver in addition to the acquired sensor data and the received input.

5. The method of claim 1, wherein the sensing comprises:
   determining the motion to be a first direction slide in response to an input received using an input receiver, from among the one or more input receivers, that is located in a first direction relative to the fingerprint sensor.

6. The method of claim 1, wherein the one or more input receivers includes two or more input receivers and wherein the sensing comprises:
   sensing the motion in response to,
      the sensor data, and
      first and second inputs received using at least two different input receivers from among the two or more input receivers, respectively.

7. The method of claim 1, further comprising:
   activating a device in response to the positive result of the verifying.

8. The method of claim 1, further comprising:
   determining whether the input fingerprint matches a registered fingerprint in response to the positive result of the verifying; and releasing a lock state of a device if the input fingerprint is determined to match the registered fingerprint.

9. The method of claim 1, wherein the sensing comprises:
sensing a movement of a contact being made with the sensing area of the fingerprint sensor based on the sensor data.

10. The method of claim 1, further comprising:
sensing the motion based on at least one of a time at which the physical object makes the contact with the sensing area of the fingerprint sensor, a change in a location at which the contact is made, a number of times that the contact is made, or an intensity of a pressure by the contact.

11. The method of claim 1, further comprising:
authorizing a protected operation to be performed in response to the positive result of the verifying; and
performing the protected operation based on the authorizing when an operation assigned to a command identified based on the motion is the protected operation.

12. The method of claim 1, further comprising:
determining whether the input fingerprint matches a registered fingerprint in response to the positive result of the verifying;
performing an operation assigned to a command identified based on the motion in response to the input fingerprint being determined to match the registered fingerprint; and
performing the operation assigned to the command identified based on the motion by restricting at least a portion of the operation in response to the input fingerprint being determined not to match the registered fingerprint.

13. A non-transitory computer-readable medium comprising program code that, when executed by a processor, causes the processor to perform functions according to the method of claim 1.

14. A fingerprint recognition-based control method comprising:
receiving, time-sequentially, a plurality of inputs from an individual in time series;
verifying whether sensor data acquired in response to at least one input for a fingerprint sensor among the plurality of inputs is a fingerprint;
identifying an input sequence from the plurality of inputs in response to the sensor data being verified to be the fingerprint; and
performing an operation assigned to the identified input sequence,
wherein the identifying comprises:
determining whether at least one ordinal input among the time-sequentially received inputs is a first input; and
identifying the input sequence and ignoring an input other than the at least one ordinal input when the at least one ordinal input is the first input.

15. The method of claim 14, wherein the receiving comprises:
receiving a plurality of items of sensor data from the fingerprint sensor in time series.

16. The method of claim 14, wherein the receiving includes receiving at least one item of sensor data from the fingerprint sensor and at least one input from at least one input receiver located in a vicinity of the fingerprint sensor or includes the fingerprint sensor in time series, and
wherein the identifying includes,
determining whether the at least one item of sensor data acquired by the fingerprint sensor matches a registered fingerprint, and
determining whether the at least one input received from the at least one input receiver is a first input.

17. The method of claim 14, wherein the identifying comprises:
determining whether each of the plurality of inputs is input as a first motion.

18. A fingerprint recognition-based control method comprising:
receiving, time-sequentially, a plurality of inputs from an individual in time series;
verifying whether sensor data acquired in response to at least one input for a fingerprint sensor among the plurality of inputs is a fingerprint;
identifying an input sequence from the plurality of inputs in response to the sensor data being verified to be the fingerprint; and
performing an operation assigned to the identified input sequence, wherein the receiving includes acquiring a plurality of items of sensor data from the fingerprint sensor in time series, and
wherein the identifying includes,
determining whether a first ordinal input among the time-sequentially received inputs is a registered fingerprint, and
determining whether a second ordinal input among the time-sequentially received inputs is a non-registered fingerprint.

19. A biometrics-based control method comprising:
acquiring biometric data of a user in response to a contact between a physical object and a sensing area of a sensor;
receiving an input through a first input receiver from among one or more input receivers, the first input receiver being located in a vicinity of the sensor; and
sensing a motion of the physical object based on the acquired biometric data and the received input in response to the biometric data being verified to be a first type of biometric data,
wherein the sensing comprises:
determining the motion to be a first direction slide in response to the biometric data acquired by the sensor being located in a first direction relative to an input receiver, from among the one or more input receivers, that receives input.

20. The method of claim 19, wherein the biometric data includes at least one of fingerprint information, blood vessel information, and iris information.

* * * * *